US007197536B2

(12) United States Patent
Beukema et al.

(10) Patent No.: US 7,197,536 B2
(45) Date of Patent: Mar. 27, 2007

(54) PRIMITIVE COMMUNICATION MECHANISM FOR ADJACENT NODES IN A CLUSTERED COMPUTER SYSTEM

(75) Inventors: Bruce Leroy Beukema, Hayfield, MN (US); Richard Charles Booth, San Jose, CA (US); David Robert Engebretsen, Cannon Falls, MN (US); Thomas Rembert Sand, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 09/845,933

(22) Filed: Apr. 30, 2001

(65) Prior Publication Data

US 2002/0174168 A1    Nov. 21, 2002

(51) Int. Cl.
G06F 15/16 (2006.01)
H04Q 11/00 (2006.01)

(52) U.S. Cl. .................. 709/205; 709/217; 709/213; 709/218; 709/251; 709/253; 370/359

(58) Field of Classification Search ............ 709/205, 709/217, 218, 220, 222, 224, 213, 243–244; 370/412–413, 359; 710/107; 712/11, 29
See application file for complete search history.

(56) References Cited

U.S. PATENT DOCUMENTS

| | | | | |
|---|---|---|---|---|
| 4,434,463 A | * | 2/1984 | Quinquis et al. | 709/253 |
| 4,539,652 A | * | 9/1985 | Rubin | 710/100 |
| 4,918,686 A | * | 4/1990 | Hayashi et al. | 370/413 |
| 5,463,735 A | * | 10/1995 | Pascucci et al. | 709/222 |
| 5,530,895 A | * | 6/1996 | Enstrom | 710/9 |

(Continued)

OTHER PUBLICATIONS

Norton, Peter and John Goodman. Peter Norton's Inside the PC, Eighth Edition. Indianapolis: Sams Publishing, 1999. p. 165.*

(Continued)

Primary Examiner—Jason Cardone
Assistant Examiner—Jeffrey R Swearingen
(74) Attorney, Agent, or Firm—Wood, Herron & Evans, LLP (57) ABSTRACT

A circuit arrangement, node, clustered computer system, and method incorporate a primitive communication mechanism for use in exchanging data between adjacent nodes coupled via a point-to-point network. A plurality of network ports are used to couple a node to other nodes in the clustered computer system over point-to-point network interconnects, and a plurality of communication registers are associated with each of the network ports for the purpose of storing data received through their associated network ports. A node desiring to communicate information to another node receives a port identifier from the other node that identifies the network port on the other node through which the pair of nodes are coupled. The port identifier is then used by the node to communicate data to the other node through the use of one or more write operations directed to the communication register on the other node that is associated with the network port identified by the port identifier. On the other node, a control circuit is used to automatically notify the other node whenever data is stored in any of its communication registers, e.g., by generating an interrupt in response to non-zero data being stored in any of such communication registers.

22 Claims, 3 Drawing Sheets

U.S. PATENT DOCUMENTS

| | | | | |
|---|---|---|---|---|
| 5,598,541 A * | 1/1997 | Malladi | | 710/106 |
| 5,675,735 A * | 10/1997 | Gallagher et al. | | 709/228 |
| 5,754,651 A * | 5/1998 | Blatter et al. | | 380/241 |
| 5,809,253 A * | 9/1998 | Gallagher et al. | | 709/228 |
| 5,812,775 A * | 9/1998 | Van Seters et al. | | 709/213 |
| 5,841,989 A * | 11/1998 | James et al. | | 709/239 |
| 5,978,569 A * | 11/1999 | Traeger | | 709/244 |
| 5,978,894 A * | 11/1999 | Sukegawa et al. | | 711/203 |
| 6,065,087 A * | 5/2000 | Keaveny et al. | | 710/315 |
| 6,151,688 A * | 11/2000 | Wipfel et al. | | 714/48 |
| 6,295,295 B1 * | 9/2001 | Wicklund | | 370/392 |
| 6,308,238 B1 * | 10/2001 | Smith et al. | | 710/310 |
| 6,338,112 B1 * | 1/2002 | Wipfel et al. | | 710/269 |
| 6,370,585 B1 * | 4/2002 | Hagersten et al. | | 709/238 |
| 6,374,316 B1 * | 4/2002 | James et al. | | 710/104 |
| 6,385,624 B1 * | 5/2002 | Shinkai | | 707/201 |
| 6,430,593 B1 * | 8/2002 | Lindsley | | 718/103 |
| 6,466,572 B1 * | 10/2002 | Ethridge et al. | | 370/352 |
| 6,535,990 B1 * | 3/2003 | Iterum et al. | | 714/4 |
| 6,721,273 B1 * | 4/2004 | Lyon | | 370/235 |
| 2001/0013059 A1 * | 8/2001 | Dawson et al. | | 709/217 |

OTHER PUBLICATIONS

Murthy, V. Keshava et al. A 2K×1K Space Switch ASIC for Use in Digital Exchanges. Proceedings on the 7th International Conference on VLSI Design. Jan. 5-8, 1994. pp. 247-250.*

Stevens, W. Richard. TCP/IP Illustrated, vol. 1: The Protocols. Boston: Addison-Wesley, 1994.*

Mano, M. Morris. Computer System Architecture. Englewood Cliffs NJ: Prentice Hall, 1993. Third Edition.*

Eberle, Hans et al. "Switcherland: A QoS Communication Architecture for Workstation Clusters." ACM SIGARCH Computer Architecture News. Proceedings of the 25th annual international symposium on Computer Architecture. vol. 26 Issue 3. Apr. 1998. 98-108.*

Shiomoto, Kohei et al. "Dynamic Burst Transfer Time-Slot-Base Network." IEEE Communications Magazine. Oct. 1999. 88-96.*

Hoganson, Kenneth. "Workload Execution Strategies and Parallel Speedup on Clustered Computers." IEEE Transactions on Computers. vol. 48, No. 11. Nov. 1999. 1173-1182.*

* cited by examiner

PRIMITIVE COMMUNICATION MECHANISM FOR ADJACENT NODES IN A CLUSTERED COMPUTER SYSTEM

FIELD OF THE INVENTION

The invention is generally directed to clustered computer systems, and in particular, to network communication and initialization thereof.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

The nodes within a clustered computer system are typically coupled to one another via some form of communication network. One type of network used to interconnect nodes, for example, is a broadcast-type network such as an ethernet network, where nodes coupled to the network have unique addresses, and where information is transmitted in the form of packets that are addressed to the particular node or nodes that are the intended recipients of the information. With a broadcast-type network, the packets are received by all nodes, and only those nodes having appropriate addresses will process the packet. Often, broadcast-type networks rely on central hubs or switches that receive packets from sending nodes and broadcast the packets to all other nodes on the network.

Another type of network used to interconnect nodes in a clustered computer system is a point-to-point network, which includes a number of point-to-point interconnections between nodes, and where the nodes themselves assist in routing packets to appropriate nodes on the network. As with a broadcast-type network, each node is typically assigned a unique address. In contrast with a broadcast-type network, however, each interconnection effectively has a single node at each end, so that a packet that needs to be sent to a node that is several interconnects away from a sending node will be relayed by all of the intermediate nodes in the path. Typically, nodes will have multiple network ports that are directly linked with individual network ports on other nodes. While point-to-point networks are typically more complex than broadcast-type networks, such networks tend to offer comparatively greater bandwidth, since individual packets are typically only routed over a subset of the networked nodes, and as a result, multiple packets may often be communicated at the same time over different paths in the network.

Both of the aforementioned types of networks typically require that each node be aware of the network address of every other node with which that node wishes to communicate. Such a requirement, however, presents a problem if a network is initialized to a state where none of the nodes has a network address assigned a priori or through an external agent, as nodes are initially unable to communicate with one another due to an inability to determine the addresses of the other nodes on the network.

Various distributed consensus algorithms are known to initialize a network and assign appropriate network addresses to various nodes that are present on a network. However, in many instances, these distributed consensus algorithms still require that each node already have a unique network address that is known to all other nodes on the network. Thus, in cases where unique network addresses have not yet been established, conventional distributed consensus algorithms cannot properly initialize a network.

The inability to properly address network communications when unique addresses have not been established for all existing nodes is particularly problematic in clustering environments, and in particular clustering environments that rely on point-to-point networks, as the high availability requirements of such systems often dictate that nodes be added to and removed from the system with minimal interruption of service, and often without interrupting communications between unaffected nodes. Moreover, even where a network is first being initialized, it is highly desirable for network addresses to be assigned with minimal, if any, administrator interaction. However, distributing network addresses among nodes in an automated manner, when the nodes are not yet aware of the network addresses of other nodes, is often not practicable in conventional clustering environments.

It has been found, therefore, that distributing network addresses throughout a cluster's network prior to assignment of unique addresses requires some form of communication mechanism that allows at least rudimentary information exchange between nodes without requiring the use of network addresses. A significant need has therefore arisen in the art for a manner of permitting at least limited communications between nodes without the requirement for unique network-wide addresses being known to all nodes.

SUMMARY OF THE INVENTION

The invention addresses these and other problems associated with the prior art by providing a circuit arrangement, node, clustered computer system, and method incorporating a primitive communication mechanism for use in exchanging data between adjacent nodes coupled via a point-to-point network, often without and/or before establishment of network-wide node addresses. To implement the primitive communication mechanism, a plurality of network ports are used to couple a node to other nodes in the clustered computer system over point-to-point network interconnects, and a plurality of communication registers are associated with each of the network ports for the purpose of storing data received through their associated network ports.

Consistent with one aspect of the invention, a node desiring to communicate information to another node receives a port identifier from the other node that identifies the network port on the other node through which the pair of nodes are coupled. The port identifier is then used by the node to communicate data to the other node through the use of one or more write operations directed to the communication register on the other node that is associated with the network port identified by the port identifier.

Consistent with another aspect of the invention, a control circuit is coupled to the communication registers of a node and is used to automatically notify the node whenever data is stored in any of the communication registers. In various embodiments consistent with the invention, for example, the control circuit may be configured to generate an interrupt in response to non-zero data being stored in any communication register for a node. In other embodiments, a software program may poll the communication registers looking for non-zero data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter address the difficulties associated with communicating information between nodes in a point-to-point network in the absence of network-wide addresses by implementing a primitive communication mechanism that functions much as a sideband communication between nodes at a very low level networking protocol. The primitive communication mechanism provides for simple communications between adjacent nodes in a point-to-point network in such a manner that no prior knowledge of the names used to address nodes in the network or preallocation of buffer space beyond that required by a set of registers to receive messages from adjacent nodes over specific network ports.

As will be discussed in greater detail below, nodes are provided with one or more network ports, and dedicated communication registers are associated with each of the network ports, and are used to store data received over the network ports. Automated detection circuitry is utilized in connection with the communication registers to automatically notify a node whenever data is received into a communication register associated with a particular network port. Moreover, given that each network port is assigned a dedicated communication register, the node can readily determine the network port through which the information was sent.

Moreover, each node is provided with a configuration register that provides node configuration information upon request to the various nodes that are coupled to such node. Among other types of configuration information, a port identifier may be supplied to indicate to which of the network ports on the local node the node requesting the configuration information is coupled. Using the port identifier, the requesting node can then direct future information to the communication register associated with that port. As such, nodes are able to communicate effectively with their adjacent neighbors, and determine both the local and remote network ports through which they and their neighbors are coupled. Among other benefits, such a communication mechanism may permit a clustered computer system network to be initialized and modified in a fairly automated and dynamic manner, e.g., by assigning and distributing network-wide addresses to the nodes in connection with a distributed consensus algorithm or the like.

Hardware/Software Environment

Figure 1:
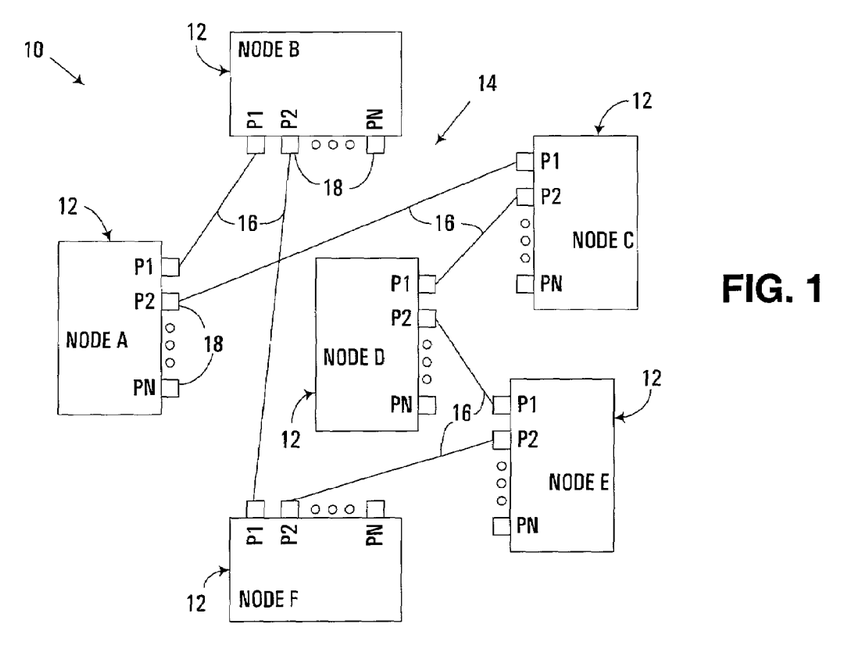
FIG. 1 is a block diagram of a clustered computer system consistent with the invention, incorporating a plurality of nodes coupled to one another via a point-to-point network.

Turning now to the Drawings, wherein like numbers denote like parts throughout the several views, FIG. 1 illustrates an exemplary clustered computer system 10 that includes a plurality of nodes 12 interconnected with one another via a point-to-point network 14, with each node incorporating a primitive communication mechanism consistent with the invention.

Each node 12 may be implemented, for example, as any of a number of multi-user computers such as a network server, a midrange computer, a mainframe computer, etc., that is capable of serving as a processing or cluster node within a cluster. Various additional types of networkable nodes 12 may also be utilized in clustered computer system 10, e.g., bridge nodes that interface processing nodes with input/output (I/O) devices, or other networkable I/O controllers, adaptors and/or devices that provide input and/output functionality for the clustered computer system. However, it will be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like). Moreover, multiple nodes may reside within a single physical computer, e.g., in a logically-partitioned system.

Point-to-point network 14 includes a plurality of point-to-point interconnections 16 that are respectively coupled between respective network ports 18 on a pair of nodes 12. Each node can have a varying number of network ports 18, and each network port is capable of directly communicating information between that port's node and another node that is directly coupled to the same interconnect 14. In the exemplary system of FIG. 1, for example, each node is shown with an arbitrary number N network ports, and it should be appreciated that each node may have a different number of ports than other nodes in the system. Moreover, it should be noted that nodes that are directly coupled to one another over a point-to-point network may be referred to hereinafter as "adjacent" nodes.

Network 14 implements a point-to-point loop network topology, where messages are passed between any two nodes on the network by relaying the messages along a path of point-to-point interconnects from a source node to a destination node. Thus, for example, in the exemplary system of FIG. 1, given an arbitrary arrangement of nodes A–F, a message sent by node A to node E might be sent first from node A to node C, relayed from node C to node D, and then relayed from node D to node E. In the alternative, the message may be sent from node A to node B, relayed from node B to node F, and then relayed from node F to node E.

Figure 2:
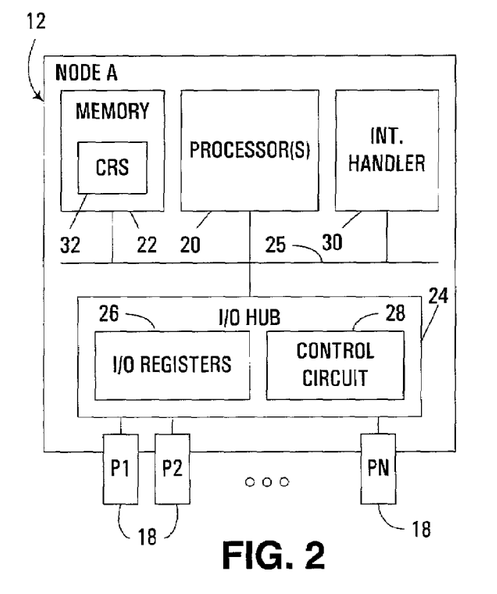
FIG. 2 is a block diagram of a node from the clustered computer system of FIG. 1.

As shown in FIG. 2, each node 12 generally includes one or more system processors 20 coupled to a memory or main storage 22 and a input/output (I/O) hub 24 over a processor bus 25. While memory 22 is illustrated as a main memory, it should be appreciated that a multi-level memory architecture may be used, whereby one or more levels of cache memory are incorporated in the processors and/or external caches (not shown separately in FIG. 2).

To provide support for various input/output (110) resources, including interconnectivity with other nodes, I/O hub 24 interfaces processor(s) 20 with the plurality of network ports 18. In this regard, a set of I/O registers 26 are maintained in I/O hub 24, a port of which are utilized in connection with the primitive communication mechanism described herein. In addition, a control circuit 28 is utilized to manage communications occurring through the I/O hub.

Also shown in FIG. 2 is an interrupt handler 30 and a clustering resource services (CRS) program 32 resident in memory 22. Interrupt handler 30 is typically implemented as a hardware circuit that is capable of halting a program executing on a node and initiating execution of interrupt handling program code to perform desired tasks in response to a hardware-generated interrupt signal supplied to the interrupt handler. Among other functions, interrupt handler 30 receives and handles interrupt signals from I/O hub 24. In the alternative, the interrupt handling circuitry may be directly implemented in other hardware components in a node, e.g., directly within a processor 20.

CRS program 32 represents a clustering infrastructure for the node, which implements, among other functions, the higher level network protocols that support the clustering-related communications between nodes in the system. In connection with implementing the higher level network protocols, CRS program 32 also manages network and clustering initialization, as well as other node management operations such as adding and removing nodes, changing network topologies, etc.

It will be appreciated that the functionality described herein may be implemented in various alternate combinations of hardware and/or software in each of nodes 12, and that the functionality may be allocated among other programs, computers or components in clustered computer system 10. Moreover, in the illustrated embodiment, typically much of the primitive communication mechanism is embodied in hardware circuitry (e.g., with hardware state machines), although a programmable controller may be used in the alternative. Nonetheless, despite the hardware-based implementation, the term "routine" may be used herein to describe the hardware-based functionality implemented in the mechanism. Moreover, other programs and layers of software may be utilized in connection with CRS program 32 to implement parts of the networking and network initialization functionality described herein. Therefore, the invention is not limited to the specific hardware and software implementation described herein.

The discussion hereinafter will focus on the specific routines and circuitry utilized to implement the above-described functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Furthermore, it will be appreciated that some or all of the functionality described herein may be implemented directly in hardware circuitry, via one or more circuit arrangements that are typically disposed on one or more integrated circuit devices.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links. Moreover, circuit arrangements, while typically disposed in operation on integrated circuit devices, may also be distributed as a program product, e.g., as a computer program or data file (referred to as a hardware definition program) defined by a hardware definition language (HDL) such as VHDL, verilog, EDIF, etc.

It will also be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Primitive Communication Mechanism

To implement a primitive communication mechanism consistent with the invention, the illustrated embodiment utilizes a set of I/O registers mapped to known register addresses within a register address space of each node. In the illustrated embodiment, for example, each node in the network includes N communication registers, each of which is configured to store data received over an associated network port for the node. In addition, a configuration register is utilized on each node to provide, among additional information, a port identifier that informs another node requesting access to a particular node, which of the network ports on the node being requested is being used to communicate with the requesting node.

In the illustrated implementation, as shown in FIG. 2, the N+1 communication and configuration registers are incorporated into the I/O registers 26 disposed in I/O hub 24. Moreover, these N+1 registers are mapped to predefined, known addresses within the register address space of each node. Control circuit 28 is utilized to control read and write access to these registers, and moreover, the control circuit incorporates automated detection circuitry that is capable of notifying the node, and typically the clustering resource service program 32 therein, of the storage of data within one of the communication registers in response to the transmission of data over an associated network node. As will be discussed in greater detail below, this automated detection circuitry is typically implemented as a hardware-generated interrupt that is asserted by the control circuit whenever non-zero data is written into one of the communication registers. As will become apparent below, however, other manners of notifying the node may be used in the alternative.

Figure 3:
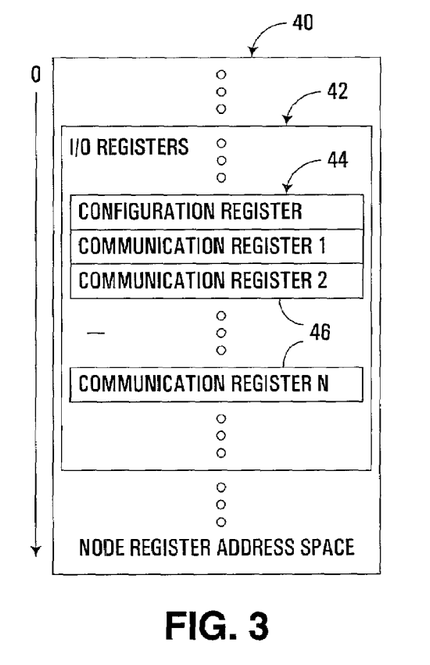
FIG. 3 is a block diagram of a node register address space for the node of FIG. 2.

Now turning to FIG. 3, as discussed above, the configuration and communication registers for a particular node are mapped to predefined addresses in the register address space for each node. FIG. 3, for example, illustrates a representative node register address space 40, having a portion of the address space allocated to the I/O registers, as shown at 42. Within the I/O register space, address space for a configuration register 44, and N communication registers 46, is provided. The specific addresses allocated to each register may vary in different applications, although typically the addresses will match from node to node. If all nodes incorporate the same mapping that is programmed into each node beforehand, each node is capable of accessing the appropriate registers through read and write requests to the known addresses of such registers. It will also be appreciated that additional registers may be mapped to the node register address space. Moreover, it will be appreciated that the register address space may be integrated into the entire memory address space for a node, or may be maintained separate therefrom.

In the illustrated implementation, each register 44, 46 is implemented using a 64-bit register. In the alternative, multiple registers may be utilized to store configuration information, as well as communication information associated with each network port (e.g., two registers of configuration information). Moreover, registers may be combined into the same physical register circuit, and addressed via separate bit ranges at a combined register address (e.g., port 1 might be allocated bits 0-31 of a communication register at address X, while port 2 might be allocated bits 32-63 of the same register). Moreover, the information stored in registers 44, 46 may be stored in the node within other hardware components than the I/O hub. In general, therefore, the precise hardware mapping of the information in the communication and configuration registers to physical register logic within a node can vary in different applications.

Figure 4:
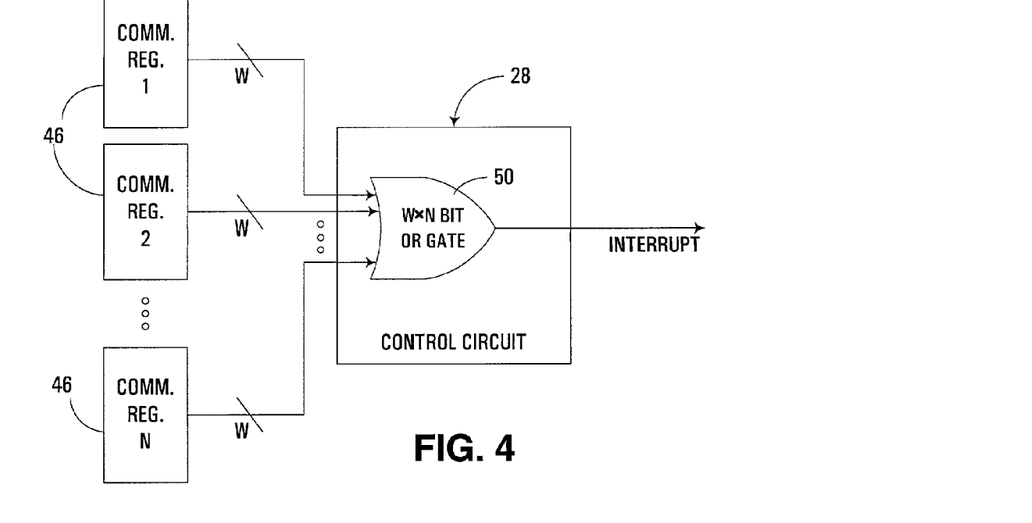
FIG. 4 is a block diagram of a control circuit for use in the node of FIG. 2.

FIG. 4 next illustrates an exemplary control circuit 28 incorporating automated detection logic for use in performing automated notification of the storage of data in a communication register 46. Control circuit 28 also typically handles read and write requests received over the various network ports, and manages communications over the processor bus 25 (FIG. 2) as well. In some embodiments, control circuit 28 may also be configured to restrict read and/or write access to various I/O registers. For example, write access to a communication register may be restricted to requests that are received from the network port associated with that communication register. In the alternative, any register may have open access to requests received from any port.

In the illustrated embodiment, the automated detection circuitry in control circuit 28 is implemented using one or more OR gates that together implement a logical-OR operation, as represented at block 50. In the illustrated implementation, each of the bits in each of the communication registers 46 is fed to logic gate 50 to perform logical-OR operation on all of the bits in all of the communication registers. Thus, for example, in the implementation illustrated in FIG. 4, assuming N communication registers, each being W bits in width, a W×N bit binary OR gate may be utilized to generate the interrupt signal. In the illustrated embodiment, for example, four network ports and dedicated 64-bit communication registers may be used, whereby block 50 may incorporate 256 binary inputs.

With this configuration, should any communication register be written with non-zero data, the assertion of any of the bit lines output from such registers will cause gate 50 to assert an interrupt signal that generates a hardware interrupt for handling by the interrupt handling circuitry in the node (block 30 of FIG. 2). So long as all communication registers store zero data patterns, the interrupt signal is not asserted in this configuration. For this reason, it is typically desirable for the control circuit and/or other logic circuitry in a node to reset a communication register to a zero pattern after the stored data has been retrieved from the register, which effectively functions as an acknowledgment that the data has been obtained.

It will be appreciated that, given the relatively simple logical operation that is performed by gate 50, a number of different hardware implementations may be used to implement this function. For example, a tree of OR gates may be used instead of a single logical OR gate, e.g., with a first level of OR gates used to logically-OR together all of the bits in each individual communication register, with a second level OR gate coupled to the outputs of the first level OR gates. Moreover, other manners of detecting storage of data into a communication register may also be used. For example, edge-triggered detection may be used to detect a change in values in one or more bits in a communication register, or the value of the data lines fed to the communication register may be polled instead of the contents of the register. Moreover, separate interrupts may be generated for each communication register and processed separately by the interrupt handling logic. Also, a software program may poll the communication registers for non-zero or otherwise modified data. Other modifications will be apparent to one of ordinary skill in the art.

The function of automatically detecting a data store into a communication register serves the purpose of providing a mechanism through which the software executing on a node can be directed to handle incoming data fed to a communication register via the primitive communication mechanism. A combination of the hardware-based detection and the software-based handling of a communication from another node provides an efficient, yet flexible communication infrastructure. However, it will be appreciated that other implementations may partition the detection and handling functionality differently among hardware and software. Therefore, the invention is not limited to the particular implementation discussed herein.

As discussed above, the configuration and communication registers are mapped to predefined locations in the register address space of each node, such that every node can access these registers on other nodes. Moreover, in the illustrated implementation, read and write accesses supported on each network port, typically with any of a number of known protocols used to communicate both an address and an access type over a point-to-point interconnection, as well as to provide write data in association with any write requests. For example, a network interconnect may include control lines, address lines and data lines, or in the alternative, multiplexed address and data lines. Moreover, requests and other transactions may occupy single or multiple interconnect cycles, as is well known in the art.

Returning to FIG. 3, the configuration register may be utilized to store various information about a particular node that is useful for use by another node in a network. Among such information is included a port identifier, which the control circuit writes into the configuration register prior to returning its contents whenever responding to a read request directed to the address of the configuration register. Other information, e.g., chip information (pertaining to the integrated circuit device that implements the primitive communication mechanism), node type information, bridge type information, node and/or chip capability information, and other information that uniquely identifies a node or chip used therein.

In the alternative, the port identifier may be returned in response to a request, without actually storing the port identifier in the configuration register, and/or without returning other configuration information. Moreover, rather than a read request directed at a configuration register, a request with another request type may be used to retrieve a port identifier, and further, in some embodiments, no configuration register may be used in connection with a primitive communication mechanism.

Using the aforementioned primitive communication mechanism, when a particular node A wishes to communicate with a neighboring node B on the network, node A sends a read request on the network, which returns the contents of the configuration register from node B. The value of the returned data indicates which of the N ports on node B the read request from A entered. This information is used by node A to pick which of the N communications registers in B to use when sending messages to B. Node A then writes a non-zero data pattern to the selected communication register in the neighboring node B, which generates an interrupt on node B. This interrupt causes node B to examine the contents of the communication register for the message data, and after the message data has been obtained from the communication register, node B resets the value of the register to 0, which deasserts the interrupt signal. Through this process, all the neighboring nodes of a given node on the network can simultaneously and independently communicate with that node.

A wide variety of data may be transferred between nodes using the aforementioned mechanism. As mentioned above, one particularly useful application is in initializing all or a portion of a network (as when a node is added to an existing network) to distribute network-wide addresses and establish higher-level networking messaging functionality.

Figure 5:
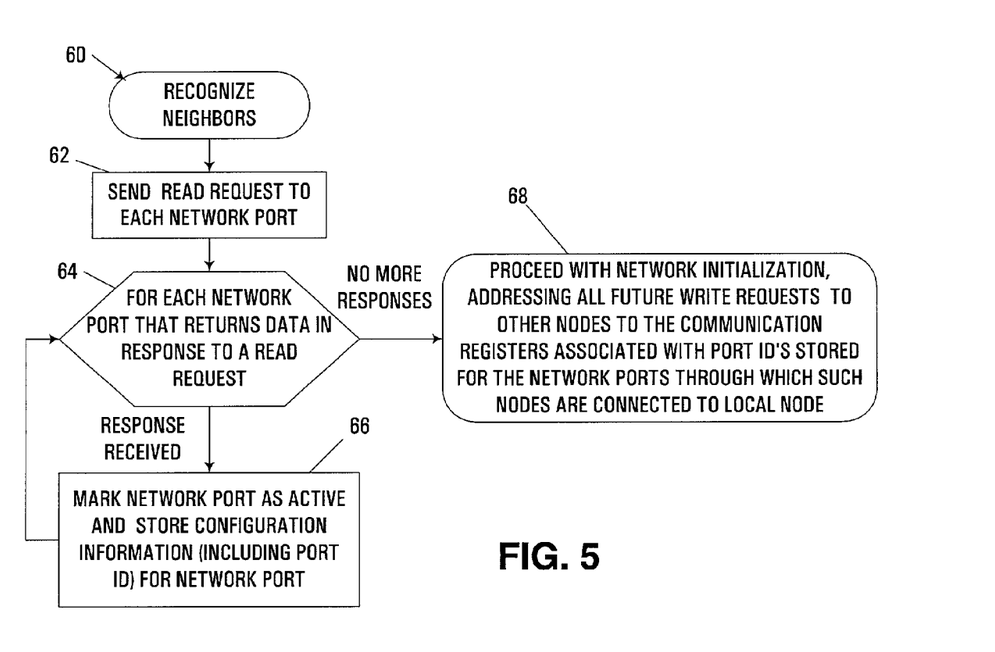
FIG. 5 is a flowchart illustrating the program flow of a recognize neighbors routine executed by the node of FIG. 2 during network initialization.

In this regard, FIG. 5 illustrates an exemplary neighbor recognition routine 60 that may be performed by each node being initialized (e.g., within the control circuit and optionally with the assistance of software executing elsewhere on the node). Routine 60 begins in block 62 by sending a read request over each network port on an initializing node. Next, block 64 loops to process each response received from adjacent nodes that are coupled to the initializing node (it will be appreciated that unused network ports will typically not respond).

As discussed above, any node that receives a read request for its configuration register over one of its network ports will return the contents of its configuration register, along with the port identifier for the port over which the request was received. Therefore, for each received response, block 64 passes control to block 66 to (1) mark the network port from which the response was received as active, and (2) store the configuration information received in the response in a local data structure on the node within which neighbor information is maintained. Among the configuration information is the port identifier for the network port on the responding node to which the initializing node is coupled. Control then returns to block 64 to process additional responses.

Once all responses are received, control passes to block 68 to proceed with network initialization, e.g., using a distributed consensus algorithm such as that discussed below in connection with FIG. 6. As described in block 68, future communications between nodes will be implemented via write requests directed to the dedicated communication register associated with the network port on each adjacent node to which the initializing node is connected.

Various interrupt handling routines may be used to handle interrupts generated by virtue of data stores to the communication registers. For example, it may be desirable to implement a round robin interrupt handling routine that, in response to the interrupt signal from control circuit 28 and passed by interrupt handler 30, polls each communication register in order for non-zero data (typically starting after the last register found to have non-zero data). If a non-zero register is found, the contents are forwarded to a higher level software program, and the register is reset to a zero value. If the interrupt signal is asserted and no non-zero data is found, an error may be signaled. Moreover, typically in many processing environments, an interrupt termination notification may need to be generated after the communicated data is retrieved from the register. For example, in a Power PC environment such as used on AS/400 or iSeries eServer midrange computers, an end of interrupt (EOI) code may be generated after the register is reset.

Other routines may be used to handle the generated interrupts. For example, different registers, and by implication, different ports, may be granted different priorities, with interrupts handled in order of priority.

It will be appreciated that other types of information may be communicated using the primitive communication mechanism consistent with the invention. Moreover, it will be appreciated that the primitive communication mechanism may be used even after higher-level network messaging has been established. For example, status and performance information for a particular network interconnection could be periodically communicated between nodes in the manner described herein, as might topology modifications made to the network. Other modifications will be apparent to one of ordinary skill in the art.

Exemplary Application

While the primitive communication mechanism described herein has a wide variety of applications, one exemplary application, for use in initializing a point-to-point network in a clustered computer system, is described hereinafter and shown in FIG. 6. In this illustrated application, for example, network addresses are distributed throughout an initializing network using a distributed consensus algorithm, and clustering is then initiated over the network.

To support the distributed consensus algorithm, a message format is typically utilized to format the data communicated via the communication registers described herein. For example, in this exemplary application, a format of 8-bits opcode, 2-bits of sliding window protocol bits (sequence number and sequence number acknowledge) and 54-bits of payload may be defined for communication register messages. Moreover, in this exemplary implementation, different opcodes may be defined as appropriate for the particular application being implemented.

Once network addresses are distributed, a higher level protocol may be used to communicate cluster communications, and such communications may still utilize the primitive communication mechanism in certain instances. One exemplary message format includes 8-bits message type, 8-bits reserved, 16-bits source node ID, 16-bits source and destination partition ID's (if logical partitioning is used), 8-bits Opcode extension and 8-bits opcode.

Given the flexibility provided by the aforementioned primitive communication mechanism, a wide variety of message formats may be envisioned. Then invention is thus not limited to the formats discussed explicitly herein.

Now, given a set of independent peer computer systems that initialize to an identical state but have unique serial numbers that exist on a common network fabric where the network protocol requires each computer system to have an unique network address, the primitive communication mechanism described herein may be used to assign a unique network address to each peer computer system on the network without outside intervention.

In this exemplary application, when each of the nodes on the network first initialize, the only difference in their state is the value of their serial number. This value is assumed to be unusable as a network address as it typically does not fit within the name space of the network protocol. At this point, the network may be considered to consist of N sub-networks, where N is the number of nodes connected via the network fabric. None of the nodes can communicate with each other via the standard network protocol that can be configured to transport packets of data between any two endpoints to the network. The only communication mechanism that is supported is the aforementioned primitive mechanism that allows two neighboring nodes on the network to send a register-size piece of data to each other per network cycle.

Figure 6:
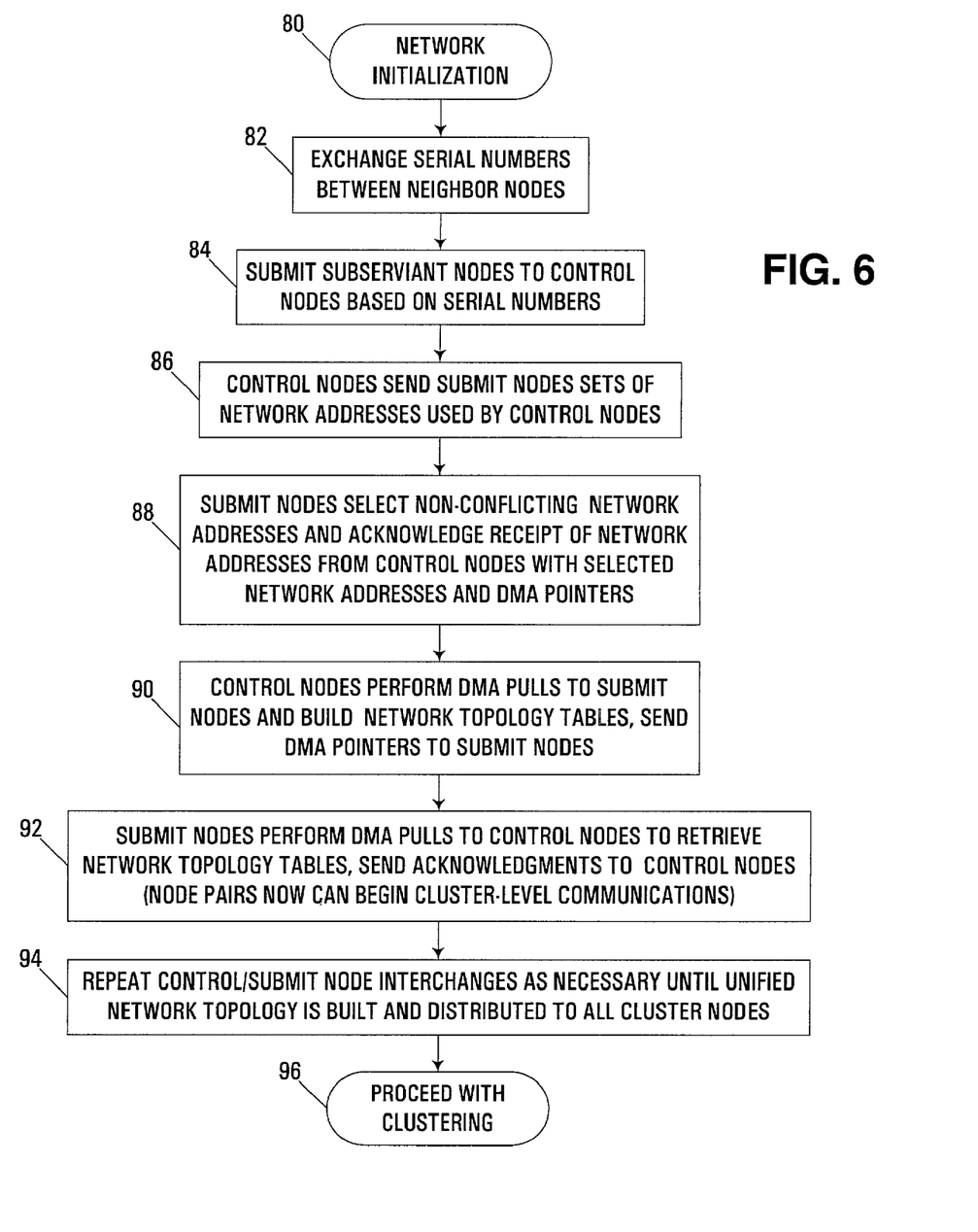
FIG. 6 is a flowchart illustrating the program flow of a network initialization routine cooperatively executed by multiple nodes in the clustered computer system of FIG. 1.

Thus, subsequent to performing the operations described above in connection with FIG. 5, and using the primitive communication mechanism described herein, each system initializes the network in the manner illustrated generally by network initialization routine 80 of FIG. 6. Routine 80 begins in block 82 by setting its state to "initialization" and then starting to send a series of messages to each of its immediate neighbors on the network fabric for the purpose of exchanging serial numbers, or any other unique node identifier. In this application, the first message from each node includes a portion of its assigned serial number. This message is encoded using a known 1-bit sliding window protocol with a 1-bit sequence number and a 1-bit acknowledgment of a previously received message piggybacked with the message. As each node receives a piece its neighbor's serial number, it acknowledges receipt of that message by either resending the last message sent (if that message has not yet been acknowledged) or by sending the next message of the initialization sequence. Following this mechanism, both nodes in a pair send the necessary number of messages for complete exchange of their serial numbers.

Next, referring to block 84, after two neighboring nodes on the network have exchanged serial numbers, they each compare the serial number of their neighbor with their own value. If the local system's serial number is greater than that of its neighbor, no further messages are generated until the remote system responds or until a timeout expires. If the local system's serial number is less than that of its neighbor, this system sends a "submit" message to the remote system and changes its state to "submit." Each lower serial number node (referred to as a submit node) becomes subservient to the higher serial number node (referred to as a control node).

Next, referring to block 86, when a node receives the "submit" message and it is in the "initialization" state, it changes its state to "control" and responds with an "init" message that contains a bit vector describing the set of network addresses being used by this node.

Next, referring to block 88, when a node receives the "init" message, it changes its network address to a non-conflicting address, changes its state to "suspended" and responds with an "initack" message that contains the new network address of the node and system address or pointer that can be referenced by the remote node in order to perform a direct memory access (DMA) to communicate a configuration table from the local node to the remote node.

Next, referring to block 90, when a node receives the "initack" message, it changes its state to "controlGroupUpdate," configures the network routing to enable communication with the neighboring node, and does a DMA pull from the address given in the initack message. After the DMA has completed, the node processes the information obtained in the DMA and builds up an accurate and complete representation of the network configuration in its own configuration table. This table is now the master configuration table for the two nodes in this portion of the network. Next, this node sends a network message, "tableupdate" that contains a system address or pointer that can be referenced by the remote node in order to DMA over the new configuration table.

Next, referring to block 92, when a node receives the "tableupdate" message, it does a DMA pull from the address and node given in the tableupdate message. After the DMA has completed, the node processes the information obtained in DMA and updates its configuration table to the accurate state given by the remote node's table. After this processing is complete, the node responds with a "tableupdateack" message to the control node.

At this point, both nodes have full network addressability to each other and can begin cluster communications. Then, referring to block 94, if any additional nodes adjoin either of these two nodes on the network, the processes repeat until all nodes in the network have been initialized in this manner, until a complete network topology is generated and distributed to all nodes on the network. Referring to block 96, clustering can proceed as appropriate, including establishing higher-level networking protocols to exchange cluster messages between the various nodes.

Various additional modification will be apparent to one of ordinary skill in the art. Therefore, the invention lies in the claims hereinafter appended.

What is claimed is:

1. A method of communicating between nodes in a clustered computer system, the method comprising:
   (a) communicating a port identifier from a first node to a second node coupled to the first node over a point-to-point network, wherein the first node includes a plurality of network ports and a plurality of communication registers, wherein each network port is configured to directly couple to an adjacent node in the clustered computer system over a point-to-point interconnect in the point-to-point network, wherein each communication register is dedicated to an associated network port among the plurality of network ports and is configured to store data received over such associated network port, and wherein the port identifier identifies a network port among the plurality of network ports to which the second node is coupled to the first node; and
   (b) communicating data from the second node to the first node by initiating a write operation on the first node using the second node to store the data in the communication register associated with the network port identified by the port identifier.

2. The method of claim 1, further comprising detecting in the first node the storage of data in the communication register associated with the network port identified by the port identifier.

3. The method of claim 2, further comprising generating an interrupt on the first node in response to detecting the storage of data in the communication register associated with the network port identified by the port identifier.

4. The method of claim 3, further comprising processing the interrupt by processing the data stored in the communication register associated with the network port identified by the port identifier, and clearing the interrupt.

5. The method of claim 4, wherein detecting the storage of data comprises detecting a non-zero value stored in any of the plurality of communication registers, and wherein clearing the interrupt comprises resetting the plurality of communication registers to zero values.

6. The method of claim 1, wherein communicating the data comprises sequentially storing a plurality of commands in the communication register associated with the network port identified by the port identifier, the method further comprising processing each of the plurality of commands in the first node.

7. The method of claim 1, further comprising initiating, with the second node, a read operation for a configuration register in the first node, wherein communicating the node identifier is performed in response to the read operation.

8. The method of claim 1, wherein communicating the node identifier is performed in response to a read request sent over the point-to-point network by the second node.

9. The method of claim 1, wherein the plurality of communication registers are allocated a range of register addresses in a register address space for the node, and wherein communicating the data comprises sending a write request to the register address of the communication register associated with the network port identified by the port identifier.

10. A circuit arrangement, comprising:
(a) a plurality of network ports, each configured to couple a first node from a clustered computer system to another node in the clustered computer system over a point-to-point network;
(b) a plurality of communication registers, each dedicated to an associated network port among the plurality of network ports and configured to store data received through such associated network port; and
(c) a control circuit coupled to the plurality of communication registers and configured to automatically notify the first node in response to storage of data in any of the plurality of communication registers.

11. The circuit arrangement of claim 10, wherein the control circuit is configured to detect the storage of data in a communication register among the plurality of communication registers by detecting a non-zero value stored in such communication register.

12. The circuit arrangement of claim 11, wherein the control circuit is configured to automatically notify the first node by generating an interrupt.

13. The circuit arrangement of claim 12, wherein the control circuit is configured to generate a common interrupt for all of the plurality of communication registers.

14. The circuit arrangement of claim 10, wherein each communication register includes a plurality of binary outputs, and wherein the control circuit comprises at least one logic gate configured to generate an interrupt signal by performing a logical-OR operation on all of the binary outputs of the plurality of communication registers.

15. The circuit arrangement of claim 10, wherein the control circuit is further configured to output a port identifier over a first network port among the plurality of network ports in response to a read request received over the first network port, the port identifier identifying the first network port as the network port from which the read request was received.

16. The circuit arrangement of claim 15, further comprising a configuration register, wherein the control circuit is configured to output data stored in the configuration register in response to the read request.

17. The circuit arrangement of claim 16, wherein the plurality of communication registers are allocated a range of register addresses in a register address space for the node, and wherein the control circuit is configured to store data received over a first network port among the plurality of network ports in the communication register associated with the first network port in response to a write request addressed to the register address of the communication register associated with the network port identified by the port identifier.

18. An integrated circuit device comprising the circuit arrangement of claim 10.

19. A program product comprising a hardware definition program that defines the circuit arrangement of claim 10, and a tangible computer readable medium bearing the hardware definition program.

20. A node for use in a clustered computer system, the node comprising:
(a) a plurality of network ports, each configured to couple to another node in the clustered computer system over a paint-to-point network;
(b) a plurality of communication registers, each dedicated to an associated network port among the plurality of network ports and configured to store data received through such associated network port; and
(c) a control circuit coupled to the plurality of communication registers and configured to automatically notify the node in response to storage of data in any of the plurality of communication registers.

21. The node of claim 20, wherein the control circuit is configured to generate the notification by signaling an interrupt in response to any of the plurality of communication registers storing a non-zero value.

22. A clustered computer system comprising:
(a) a plurality of nodes, each node including:
(i) a plurality of network ports;
(ii) a plurality of communication registers, each dedicated to an associated network port among the plurality of network ports and configured to store data received through such associated network port; and
(iii) a control circuit coupled to the plurality of communication registers and configured to automatically notify such node in response to storage of data in any of the plurality of communication registers; and
(b) a plurality of point-to-point network interconnects, each coupled between a pair of nodes from the plurality of nodes through network ports on each of the pair of nodes.

* * * * *